(12) United States Patent  (10) Patent No.: US 8,486,853 B2
Shiratori et al.  (45) Date of Patent: Jul. 16, 2013

(54) EXHAUST GAS PURIFYING CATALYST AND METHOD FOR MANUFACTURING THE SAME

(75) Inventors: Kazuyuki Shiratori, Yokohama (JP); Katsuo Suga, Yokohama (JP); Masanori Nakamura, Yokohama (JP); Hironori Wakamatsu, Yokohama (JP); Hiroto Kikuchi, Hiratsuka (JP); Tetsuro Naito, Yokohama (JP); Jun Ikezawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/254,313

(22) PCT Filed: Mar. 4, 2010

(86) PCT No.: PCT/JP2010/053568
§ 371 (c)(1),
(2), (4) Date: Nov. 15, 2011

(87) PCT Pub. No.: WO2010/101223
PCT Pub. Date: Sep. 10, 2010

(65) Prior Publication Data
US 2012/0053050 A1    Mar. 1, 2012

(30) Foreign Application Priority Data
Mar. 4, 2009    (JP) .................................. P2009-051071

(51) Int. Cl.
*B01J 23/00*    (2006.01)
*B01J 21/00*    (2006.01)
*B01J 20/00*    (2006.01)

(52) U.S. Cl.
USPC ........... 502/327; 502/240; 502/241; 502/242; 502/243; 502/252; 502/258; 502/259; 502/260; 502/261; 502/262; 502/263; 502/300; 502/302; 502/304; 502/328; 502/330; 502/332; 502/333; 502/334; 502/335; 502/336; 502/337; 502/338; 502/339; 502/340; 502/341; 502/344; 502/349; 502/355; 502/415; 502/439

(58) Field of Classification Search
USPC ................. 502/258–263, 300, 327–339, 349, 502/355, 415, 439, 240–243, 252, 302, 304, 502/340, 341, 344
See application file for complete search history.

(56) References Cited

U.S. PATENT DOCUMENTS 5,948,377 A * 9/1999 Sung ........................ 423/213.5
6,025,297 A * 2/2000 Ogura et al. ................. 502/300

(Continued)

FOREIGN PATENT DOCUMENTS

CN      101219380 A    7/2008
CN      1014004410 A   4/2009

(Continued)

OTHER PUBLICATIONS

USPTO, Office Action, U.S. Appl. No. 13/056,438, Sep. 28, 2012, 15 pages.

(Continued)

*Primary Examiner* — Cam N. Nguyen
(74) *Attorney, Agent, or Firm* — Foley & Lardner LLP

(57) ABSTRACT

An exhaust gas purifying catalyst (1) according to the present invention includes noble metal particles (6), a first compound (7) supporting the noble metal particles (6), and a second compound (9) disposed not in contact with the noble metal particles (6) and having an oxygen storage capacity. An average distance between the first compound (7) and the second compound (9) is between 5 nm and 300 nm.

15 Claims, 5 Drawing Sheets

U.S. PATENT DOCUMENTS

| | | | |
|---|---|---|---|
| 6,107,239 A * | 8/2000 | Qin et al. | 502/300 |
| 6,458,741 B1 | 10/2002 | Roark et al. | |
| 6,528,029 B1 * | 3/2003 | Dettling et al. | 423/210 |
| 6,528,451 B2 | 3/2003 | Brezny et al. | |
| 6,808,687 B1 | 10/2004 | Uenishi et al. | |
| 7,022,644 B2 | 4/2006 | Foong et al. | |
| 7,220,702 B2 * | 5/2007 | Hara et al. | 502/327 |
| 7,229,947 B2 * | 6/2007 | Hara et al. | 502/327 |
| 7,297,654 B2 * | 11/2007 | Kimura et al. | 502/326 |
| 7,498,288 B2 * | 3/2009 | Matsueda et al. | 502/325 |
| 7,517,510 B2 * | 4/2009 | Chen et al. | 423/213.2 |
| 7,550,124 B2 * | 6/2009 | Chen et al. | 423/213.2 |
| 7,563,744 B2 * | 7/2009 | Klein et al. | 502/326 |
| 7,585,811 B2 * | 9/2009 | Nakamura et al. | 502/327 |
| 7,601,670 B2 * | 10/2009 | Yasuda et al. | 502/326 |
| 7,605,108 B2 * | 10/2009 | Wakamatsu et al. | 502/326 |
| 7,674,744 B2 * | 3/2010 | Shiratori et al. | 502/327 |
| 7,713,908 B2 * | 5/2010 | Yamamoto et al. | 502/300 |
| 7,713,911 B2 * | 5/2010 | Wakamatsu et al. | 502/332 |
| 7,718,567 B2 * | 5/2010 | Hanaki et al. | 502/304 |
| 7,754,171 B2 * | 7/2010 | Chen et al. | 423/213.2 |
| 7,759,279 B2 | 7/2010 | Shiratori et al. | |
| 7,785,545 B2 | 8/2010 | Miyoshi et al. | |
| 7,799,298 B2 * | 9/2010 | Pfeifer et al. | 423/213.2 |
| 7,851,405 B2 * | 12/2010 | Wakamatsu et al. | 502/332 |
| 8,011,181 B2 | 9/2011 | Hirata | |
| 8,080,494 B2 * | 12/2011 | Yasuda et al. | 502/327 |
| 2004/0009106 A1 * | 1/2004 | Galligan et al. | 422/180 |
| 2005/0163677 A1 * | 7/2005 | Galligan et al. | 422/180 |
| 2005/0215429 A1 * | 9/2005 | Wakamatsu et al. | 502/332 |
| 2006/0019824 A1 | 1/2006 | Miyoshi et al. | |
| 2006/0217263 A1 | 9/2006 | Kawamoto et al. | |
| 2007/0025901 A1 * | 2/2007 | Nakatsuji et al. | 423/239.2 |
| 2007/0104623 A1 | 5/2007 | Dettling et al. | |
| 2007/0110650 A1 * | 5/2007 | Pfeifer et al. | 423/213.5 |
| 2007/0203021 A1 * | 8/2007 | Nakamura et al. | 502/304 |
| 2007/0238605 A1 * | 10/2007 | Strehlau et al. | 502/60 |
| 2008/0044330 A1 * | 2/2008 | Chen et al. | 423/213.5 |
| 2008/0139382 A1 | 6/2008 | Morisaka et al. | |
| 2008/0167181 A1 | 7/2008 | Nakamura et al. | |
| 2008/0233039 A1 * | 9/2008 | Hagemeyer et al. | 423/351 |
| 2009/0069174 A1 * | 3/2009 | Morikawa et al. | 502/261 |
| 2009/0111688 A1 | 4/2009 | Nakamura et al. | |
| 2009/0239739 A1 * | 9/2009 | Yasuda et al. | 502/241 |
| 2009/0275467 A1 * | 11/2009 | Shiratori et al. | 502/303 |
| 2009/0280978 A1 * | 11/2009 | Nakamura et al. | 502/303 |
| 2009/0318286 A1 * | 12/2009 | Nagata et al. | 502/339 |
| 2011/0177939 A1 | 7/2011 | Nakamura et al. | |
| 2012/0131911 A1 | 5/2012 | Nakagawa et al. | |

FOREIGN PATENT DOCUMENTS

| | | |
|---|---|---|
| DE | 60314 98 4 T2 | 3/2008 |
| EP | 1 657 291 A1 | 5/2006 |
| EP | 1 952 876 A1 | 8/2008 |
| EP | 1 955 765 A1 | 8/2008 |
| EP | 2 022 562 A1 | 2/2009 |
| EP | 2 308 593 A1 | 4/2011 |
| JP | 10-249198 A | 9/1998 |
| JP | 2002-011350 A | 1/2002 |
| JP | 2005-000829 A | 1/2005 |
| JP | 2006-043541 A | 2/2006 |
| JP | 2006-075716 A | 3/2006 |
| JP | 2006-297372 A | 11/2006 |
| JP | 2007-050382 A | 3/2007 |
| JP | 2007-105632 A | 4/2007 |
| JP | 2007-144290 A | 6/2007 |
| JP | 2007-229653 A | 9/2007 |
| JP | 2007-229654 A | 9/2007 |
| JP | 2007-313493 A | 12/2007 |
| JP | 2008-062156 A | 3/2008 |
| JP | 2008-093496 A | 4/2008 |
| JP | 2008-168192 A | 7/2008 |
| JP | 2008-272745 A | 11/2008 |
| RU | 2005538 C1 | 1/1994 |
| RU | 2262983 C2 | 10/2005 |
| RU | 2286209 C2 | 10/2006 |
| RU | 2322296 C1 | 4/2008 |
| WO | WO-02/072256 A2 | 9/2002 |
| WO | WO 2007/052627 A1 | 5/2007 |
| WO | WO 2007/119658 A1 | 10/2007 |

OTHER PUBLICATIONS

USPTO Office Action, U.S. Appl. No. 13/056,438, Apr. 3, 2013, 9 pages.

* cited by examiner

DISTANCE BETWEEN FIRST COMPOUND
AND SECOND COMPOUND (nm)

DISTANCE BETWEEN FIRST COMPOUND
AND SECOND COMPOUND (nm)

FIG. 5
(a)
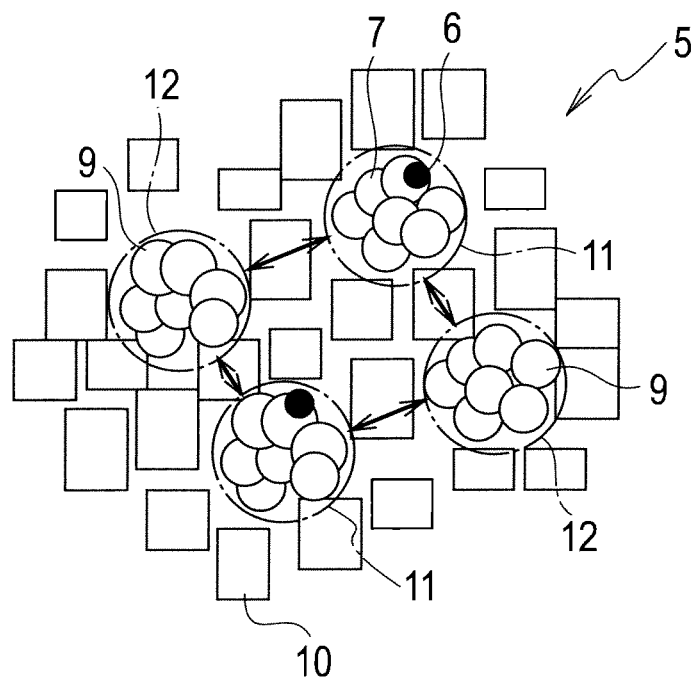
(b)
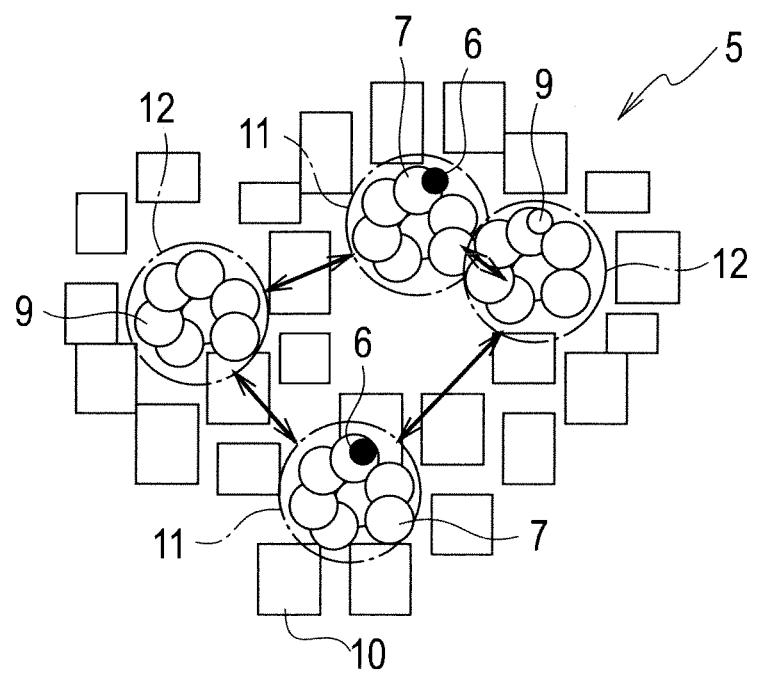

US 8,486,853 B2

EXHAUST GAS PURIFYING CATALYST AND METHOD FOR MANUFACTURING THE SAME

TECHNICAL FIELD

The present invention relates to an exhaust gas purifying catalyst suitably used for purifying exhaust gas emitted from an internal combustion engine, and a method for manufacturing the same.

BACKGROUND ART

In recent years, an exhaust gas purifying catalyst in which noble metal particles are supported on a metal oxide carrier has been widely used in order to remove harmful substances such as hydrocarbon (HC), carbon monoxide (CO) and nitrogen oxide (NOx) contained in exhaust gas emitted from an internal combustion engine. A conventional exhaust gas purifying catalyst contains a large amount of noble metal so as to enhance durability of noble metal particles with respect to peripheral atmospheric fluctuations. On the other hand, the use of a large amount of noble metal is not desirable in view of protection of earth resources.

In consideration of such an issue, a catalyst has been disclosed that contains transition metal such as cerium (Ce) to function as an oxygen storage component and manganese (Mn) to function as an active oxygen supplying material provided adjacent to noble metal particles by use of an impregnation method (refer to Patent Literature 1). This catalyst ensures enhanced durability of the noble metal particles due to prevention of atmospheric fluctuations at the periphery of the noble metal particles by the transition metal provided adjacent to the noble metal particles. In addition, the exhaust gas purifying catalyst manufactured by such a method is expected to have enhanced activity of the noble metal particles in addition to enhanced durability of the noble metal particles.

CITATION LIST

Patent Literature

Patent Literature 1: Japanese Patent Unexamined Publication No. 2005-000829

SUMMARY OF INVENTION

However, in an exhaust gas purifying catalyst manufactured by an impregnation method, noble metal particles and transition metal particles are not provided in a microparticle state even if the noble metal particles and the transition metal particles come into contact with each other. Alternatively, even if the noble metal particles and the transition metal particles are provided in a microparticle state, the noble metal particles and the transition metal particles cannot come into contact with each other, or only a small amount of the noble metal particles and the transition metal particles can come into contact with each other. Accordingly, an enhancement in durability is not sufficient since it is hard to allow the transition metal particles to be provided adjacent to the noble metal particles as intended.

The present invention has been made in view of such a conventional problem. It is an object of the present invention to provide an exhaust gas purifying catalyst, in which noble metal particles and transition metal particles are optimally provided mutually, so as to enhance durability and a purifying performance, and to provide a method for manufacturing the catalyst.

An exhaust gas purifying catalyst according to the first aspect of the present invention includes: noble metal particles; noble metal particles; a first compound supporting the noble metal particles; and a second compound disposed not in contact with the noble metal particles and having an oxygen storage capacity, wherein an average distance between the first compound and the second compound is between 5 nm and 300 nm.

A method for manufacturing the exhaust gas purifying catalyst according to the second aspect of the present invention includes: pulverizing the first compound and the second compound individually or integrally; and enclosing the first compound and the second compound pulverized with a precursor of the third compound concurrently.

BRIEF DESCRIPTION OF DRAWINGS

FIG. 1(a) is a perspective view showing an exhaust gas purifying catalyst, FIG. 1(b) is a partially enlarged schematic view of a reference numeral B in FIG. 1(a), and FIG. 1(c) is a schematic view showing catalyst powder.

FIG. 5 is a schematic view showing examples of catalyst powder having different degrees of dispersion.

DESCRIPTION OF EMBODIMENTS

Figure 1:
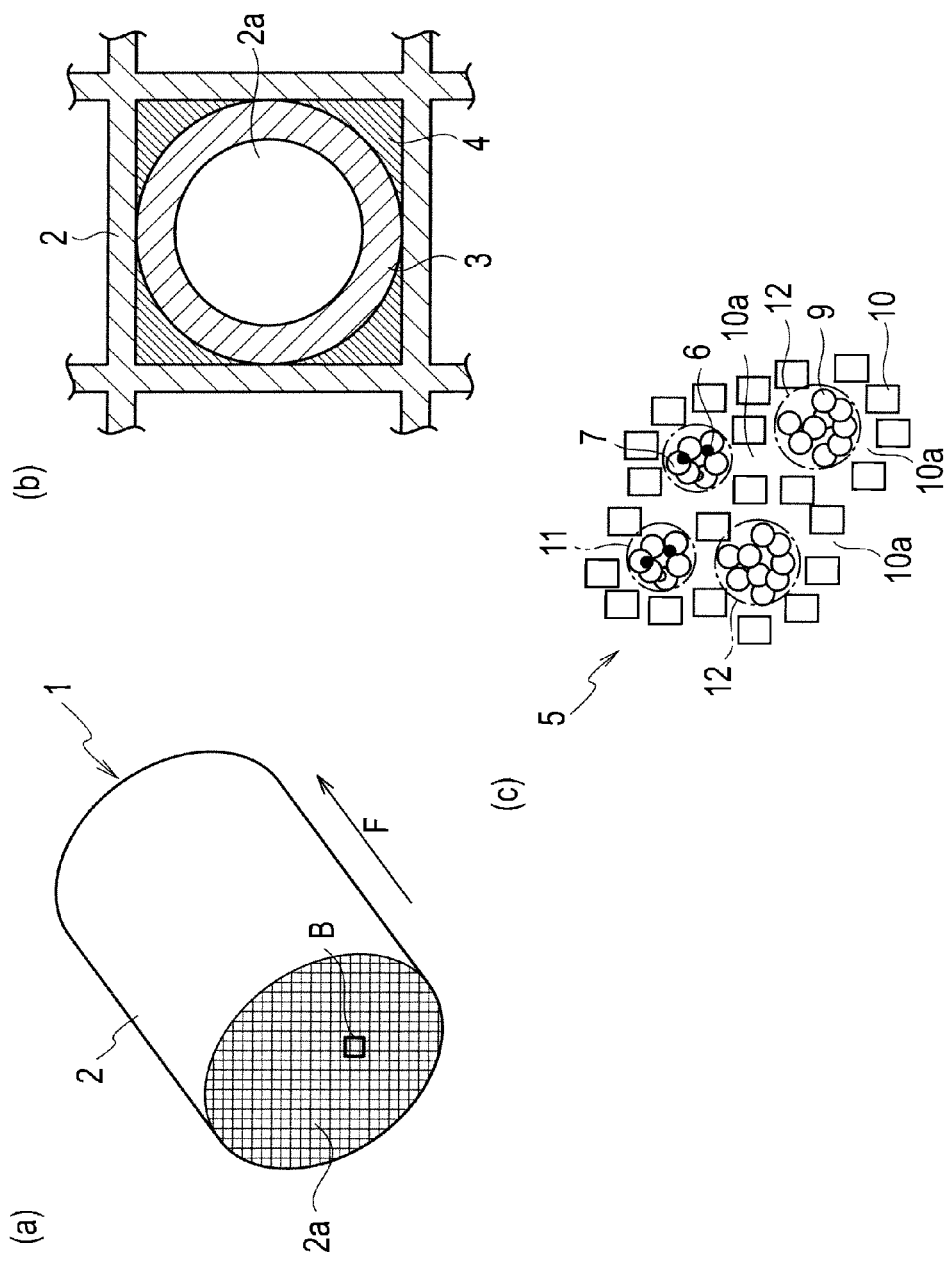
FIG. 1 is a schematic view showing an exhaust gas purifying catalyst according to the embodiment of the present invention.

A description will be made below in detail of the embodiment of the present invention with reference to the drawings. Note that, the dimensional ratios in the drawings are exaggerated for convenience of explanation, and may be different from the actual ratios.

[Exhaust Gas Purifying Catalyst]

FIG. 1 shows an exhaust gas purifying catalyst (hereinafter, also referred to as a catalyst) 1 according to the embodiment of the present invention. As shown in FIG. 1(a), the exhaust gas purifying catalyst 1 includes a honeycomb substrate (a refractory inorganic substrate) 2 having a plurality of cells 2a. Exhaust gas passes through the respective cells 2a in an exhaust gas flow direction F, and comes into contact with a catalyst layer, so that the exhaust gas is purified.

The exhaust gas purifying catalyst 1 is provided with plural catalyst layers 3 and 4 formed on the inner surface of the substrate 2 as shown in FIG. 1(b). The catalyst layers include catalyst powder 5 containing noble metal particles 6, a first compound 7 supporting the noble metal particles 6, and a second compound 9 having an oxygen storage capacity and disposed not in contact with the noble metal particles 6. An average distance between the first compound 7 and the second compound 9 is between 5 nm and 300 nm. Note that, the first compound 7 is in contact with the noble metal particles 6 and has the effect of suppressing the movement of the noble metal particles 6. Hereinafter, a compound having such an effect is referred to as an anchor material.

In general, the extremely important function for an exhaust gas purifying catalyst for a vehicle is to sufficiently supply active oxygen to noble metal particles in order to purify exhaust gas. Therefore, an oxygen storage component (OSC material), which is provided adjacent to the noble metal particles and functions to adsorb and release active oxygen at the time of atmospheric fluctuations of exhaust gas, is a particularly essential material in order to improve a purifying performance of the catalyst.

The exhaust gas purifying catalyst to which the OSC material is added is required to have the following three conditions: (1) the amount of the OSC material in the catalyst (the amount of adsorbed and released oxygen); (2) the oxygen storage and release velocity of the OSC material; and (3) the distance between the noble metal particles and the OSC material, all of which are extremely important. In particular, the present invention is focused on the condition (3) the distance between the noble metal particles and the OSC material.

In the case of increasing or decreasing the amount of the OSC material in the condition (1), it is assumed that there is a predetermined optimal amount of the OSC material. That is, if the amount of the OSC material in the catalyst is insufficient for the optimal amount, active oxygen is not supplied sufficiently to the noble metal particles in the case of a rich atmosphere, for example, at the time of acceleration. As a result, a performance for purification of HC and CO is decreased. On the other hand, if the amount of the OSC material is excessive for the optimal amount, active oxygen that the OSC material adsorbs is excessively released at the time of a large shift from a lean atmosphere to a stoichiometric or rich atmosphere, for example, at the time of acceleration immediately after deceleration, or fuel injection during deceleration. As a result, a performance for purification of NOx is particularly decreased. Based on these reasons, it is recognized that there is a predetermined optimal amount of the OSC material in the catalyst, and a decrease in catalytic performance may be caused by an excessive increase or decrease of the amount of the OSC material. The optimal amount of the OSC material may be measured by tests. The amount of the OSC material differs depending on the type of noble metal and the ratio of noble metal used in the catalyst; however, the amount of the OSC material is generally 5 to 100 g/L in terms of $CeO_2$ conversion per a volume of the substrate. In addition, the storage and release amount of oxygen of the OSC material may be obtained generally by thermogravimetry-differential thermal analysis (TG-DTA) or a temperature programmed reduction measurement (a TPR measurement). For example, according to the measurement method by TPR, the OSC material is subjected to pretreatment in an oxygen atmosphere, the temperature is increased in a reducing atmosphere such as under the flow of $H_2$, and $H_2O$ or $CO_2$ to be released is quantified, so that the storage and release amount of oxygen is measured.

Thus, in the case of subjecting noble metal to microparticulation to support on the carrier, and optimally determining the amount of the OSC material in the catalyst, the noble metal particles to which the appropriate amount of active oxygen is supplied from the OSC material can effectively use the active oxygen for purification of CO and HC and also purification of NOx. On the other hand, the noble metal particles to which the inappropriate amount of active oxygen is supplied may not use the active oxygen effectively. As a result, concerns about insufficient purification of CO and HC, and also insufficient purification of NOx by the noble metal particles may be raised.

In view of such a situation, the present invention is focused on the condition (3) the distance between the noble metal particles and the OSC material as described above. As the distance between the noble metal particles and the OSC material is closer, the supplying efficiency of active oxygen is increased when the cases each of which has the identical amount of the OSC material in the exhaust gas purifying catalyst are compared. Therefore, active oxygen can be supplied to the noble metal particles in a much shorter period of time at the time of atmospheric fluctuations. Thus, when the distance between the noble metal particles and the OSC material is close, the catalyst is considered to ensure an effect of a performance improvement that is similar to the improvement of the condition (2) the oxygen storage and release velocity of the OSC material, among the three conditions described above.

A specific method of bringing the noble metal particles and the OSC material closer to each other may be to support the noble metal particles on the OSC material. However, the structure in which the noble metal particles are supported on the OSC material is not necessarily appropriate because of the following reasons. First, the OSC material having an oxygen storage and release capacity generally causes a large decrease in specific surface area because of a crystal growth under an exhaust gas atmosphere at high temperature, compared with alumina or the like known as a carrier to support metal particles. Therefore, when the noble metal particles are supported on the OSC material, a decrease in active surface area tends to be easily caused because of aggregation of the noble metal particles. In addition, rhodium (Rh) tends to have a high catalytic activity in a reducing state, and tends to have a lower catalytic activity in a high oxidation state. In the case in which such noble metal is supported on the OSC material, active oxygen is supplied mainly at the interface between the noble metal particles and the OSC material, and therefore, the noble metal particles fall into a high oxidation state. As a result, a decrease in catalytic performance is caused.

On the other hand, in the structure in which noble metal is not supported directly on the OSC material, the supply of active oxygen to the noble metal is delayed when there is a large distance between the OSC material and the noble metal. As a result, when a flow rate of exhaust gas is rapidly changed during acceleration and the like, and a catalytic atmosphere varies, a purifying reaction cannot comply with the change. Accordingly, a purifying performance of the catalyst is decreased.

In consideration for the above-described conflicting matters, the object of the present invention is to prevent a decrease in active surface area because of aggregation of noble metal particles, prevent a high oxidation state of the noble metal particles, and prevent a delay in supply of active oxygen to the noble metal particles, so as to improve a purifying performance of the catalyst. More specifically, one of the subject matters of the present invention is to adjust an average distance between the first compound supporting the noble metal particles and the second compound having an oxygen storage capacity to between 5 nm and 300 nm. Due to such a configuration, the supplying efficiency of oxygen to noble metal is improved, and a decrease in catalytic performance because of excessive oxygen is prevented. When the average distance is less than 5 nm, a decrease in purifying performance may be caused because of a high oxidation state of the noble metal particles. On the other hand, when the average distance is more than 300 nm, oxygen is not sufficiently supplied to the noble metal particles, and as a result, a decrease in purifying performance may be caused. A method for measuring the distance between the first compound and the second compound will be described below.

Note that, PCT International Publication WO2007/52627 describes the use of cerium as a first compound. However, this publication does not specifically describe a distance between noble metal particles and an OSC material in catalyst powder. In general, an OSC material is added in a catalyst layer as another particle. Therefore, in the case of using such an addition method in the catalyst described in the above-mentioned publication, the distance between the noble metal particles and the OSC material adjusted to 300 nm or less as in the case of the present invention is not necessarily appropriate. This is because, in order to adjust the distance to 300 nm or less using a method of adding an OSC material separately in a catalyst layer, powder that supports noble metal particles and OSC material particles are both required to be pulverized to have a size of 300 nm and then applied to obtain a coating layer. However, when the catalyst layer is formed from such a finely pulverized raw material, a gas diffusion performance tends to be easily decreased since a volume of fine pores in the catalyst layer provided from gaps between the particles is decreased. Further, a decrease in performance of the catalyst layer may be caused since exfoliation of the catalyst layer is easily caused. In the present invention, however, the OSC material (the second compound) contained in addition to the first compound supporting the noble metal particles is provided in the catalyst powder. Therefore, the distance between the noble metal particles and the OSC material can be adjusted to the range of 5 nm to 300 nm without causing problems with regard to a gas diffusion performance at the time of forming the catalyst layer, and exfoliation of the catalyst layer.

The catalyst powder 5 shown in FIG. 1(c) includes, in addition to the first compound 7 in contact with the noble metal particles 6 and the second compound 9, a third compound (an inclusion material) 10 that encloses both the first compound 7 and the second compound 9, and separates the first compound 7 from the second compound 9. In addition, the catalyst powder 5 includes catalyst units 11 containing the noble metal particles 6 and secondary particles of the first compound 7, and promoter units 12 containing secondary particles of the second compound 9, and the respective units are enclosed in the regions partitioned by the third compound 10. It is to be noted that the first compound 7 and the second compound 9 may be provided as primary particles in the regions partitioned by the third compound 10.

Since the third compound 10 concurrently encloses the first compound 7 as an anchor material and the second compound 9 as an OSC material, this catalytic structure can be maintained even after a durability test. In addition, since mutual aggregation and contact of the first compound 7 supporting the noble metal particles 6 with the second compound 9 as an OSC material are prevented due to the third compound 10, a high catalytic performance can be maintained even after a durability test.

The catalyst powder 5 will be explained more specifically. In the catalyst powder 5, the noble metal particles 6 and the particles of the first compound 7 come into contact with each other, and the noble metal particles 6 and the first compound 7 are chemically bonded together, so that the movement of the noble metal particles 6 is prevented. Moreover, the periphery of the first compound 7 on which the noble metal particles 6 are supported is covered and enclosed with the third compound 10, so that the movement of the noble metal particles 6 beyond the section partitioned by the third compound 10 is physically suppressed. Namely, the third compound 10 that functions as a partitioning member can prevent the noble metal particles 6 from changing into vapor phase because of oxidation and moving to aggregate with the adjacent noble metal particles 6. Furthermore, since the first compound 7 is enclosed in the section partitioned by the third compound 10, a mutual contact and aggregation of the respective first compounds 7 beyond the section partitioned by the third compound 10 are prevented. Accordingly, not only aggregation of the first compound 7 but also aggregation of the noble metal particles 6 supported on the first compound 7 can be prevented.

In addition, the periphery of the second compound 9 having an oxygen storage capacity is also covered and enclosed with the third compound 10, so that a physical movement of the second compound 9 is prevented. Namely, since the second compound 9 is enclosed in the section partitioned by the third compound 10, a mutual contact and aggregation of the respective second compounds 9 beyond the section partitioned by the third compound 10 is suppressed, so that a decrease in specific surface area can be prevented.

Note that, the third compound 10 used in the catalyst powder 5 does not completely cover the peripheries of the first compound 7 and the second compound 9. In other words, the third compound 10 has fine pores having a size sufficient to allow exhaust gas and active oxygen to pass therethrough, while covering the first compound 7 and the second compound 9 sufficiently to prevent a physical movement of the respective compounds. More specifically, as shown in FIG. 1(c), while the third compound 10 adequately covers the first compound 7 and the second compound 9 and prevent aggregation of the particles of the respective compounds, the third compound 10 having a plurality of fine pores 10a allows exhaust gas and active oxygen to pass through the fine pores 10a. Accordingly, an average fine pore diameter of the fine pores 10a is preferably smaller than an average particle diameter of the first compound 7 and the second compound 9. In particular, the average fine pore diameter of the fine pores 10a is preferably 30 nm or less, more preferably between 10 nm and 30 nm. This fine pore diameter may be obtained by a gas adsorption method.

The above-mentioned PCT International Publication WO2007/52627 describes an exhaust gas purifying catalyst including noble metal particles, a first compound (an anchor material) supporting the noble metal particles, and a second compound (an inclusion material) enclosing the noble metal particles and the first compound. Due to such a catalytic structure, the noble metal particles are controlled to maintain the diameter of approximately 10 nm even after a durability test, and a specific surface area of the noble metal particles is increased successfully. However, exhaust gas may not easily come into contact with active sites because of the structure in which the noble metal particles as active sites and the anchor material are covered with the inclusion material. Similarly, active oxygen generated by the OSC material provided in the catalyst layer but still outside the catalyst powder does not easily come into contact with the active sites as well as the exhaust gas.

With regard to this matter, the amount of active oxygen may be increased when the amount of the OSC material to be added in the catalyst layer is increased. However, in the case in which a large amount of the OSC material is added and oxygen is excessively released, the atmosphere in the catalyst is more to lean even when, for example, exhaust gas from an internal combustion engine is adjusted to an atmosphere between a rich condition and a stoichiometric condition. As a result, there are problems of a decrease in NOx conversion rate, and an excessive supply of fuel to the engine because an A/F sensor or an $O_2$ sensor provided downstream of the catalyst carries out feedback inadequately. At the time of stopping supplying fuel, for example, at the time of deceleration, the atmosphere of exhaust gas is lean. In order to prevent a decrease in NOx purification rate under the lean atmosphere, a control for reaction between HC and NOx in the fuel (rich spike) by fuel injection for a short period of time may be carried out. However, when the amount of the OSC material is provided excessively, HC derived from the rich spike and active oxygen released from the OSC material are reacted on the active sites. Thus, a decrease in NOx purification rate may not be resolved. Therefore, oxygen is required to be supplied to the active sites appropriately without an increase of the total amount of the OSC material in the catalyst layer.

One of the methods of supplying active oxygen to the active sites without increasing the total amount of the OSC material in the catalyst layer is to apply the OSC material having an oxygen storage capacity to the anchor material that supports noble metal particles. However, at the interface between the noble metal particles and the OSC material, oxidation of the noble metal particles is easily promoted because of the supply of active oxygen to the noble metal particles.

On the other hand, according to the present invention, the first compound and the second compound are provided in the same catalyst powder in such a manner that the average distance between the first compound supporting the noble metal particles and the second compound having an oxygen storage capacity is adjusted to a predetermined distance. Therefore, active oxygen released from the OSC material can be effectively supplied to the active sites. Accordingly, a high catalyst purifying performance can be achieved even at a rapid flow rate of exhaust gas and under atmosphere fluctuations, for example, at the time of acceleration. At the same time, a decrease in activity because of high oxidization of the noble metal particles can be prevented.

As described above, in the catalyst powder 5, since the first compound 7 comes into contact with the noble metal particles 6 so as to be chemically bonded together, a movement of the noble metal particles 6 is prevented. In addition, since the third compound 10 encloses the peripheries of the first compound 7 in contact with the noble metal particles 6 and the second compound 9, a movement of the noble metal particles 6 is physically prevented. According to these elements, the exhaust gas purifying catalyst 1 of the present invention can prevent a decrease in catalytic activity due to aggregation of the noble metal particles 6 without increasing manufacturing cost and environmental load.

A measurement of the distance between the first compound and the second compound in the catalyst powder may be carried out according to the following steps:

(1) TEM-EDX analysis or HAADF-STEM analysis of the catalyst powder;

(2) an outline extraction of the first compound and the second compound from the images;

(3) defining circular approximation and each central point from surface areas based on the extracted outlines; and (4) detecting the closest central points and measuring the distance.

The method of the measurement of the distance is not limited to the above-described method, and may be any methods as long as objectivization and repeatability can be ensured.

(1) TEM-EDX Analysis or HAADF Analysis of Catalyst Powder

Catalyst powder is subjected to embedding treatment using epoxy resin, followed by curing treatment. Thereafter, an ultrathin piece is formed by use of an ultramicrotome. Using the ultrathin piece thus obtained, the catalyst powder is observed by a transmission electron microscope (TEM), or by HAADF-STEM (High-Angle Annular Dark-Field Scanning Transmission Electron Microscopy), so as to discriminate among a first compound, a second compound, and also a third compound. More specifically, with regard to the analysis conditions in the case of using TEM-EDX, the obtained images are focused on contrast (shadowed) areas first. Then, elemental species of the areas are analyzed and confirmed, so as to identify compound particles including the elements.

Although the elemental species of the first compound and the second compound may overlap each other, the first compound supporting noble metal is distinguishable from the second compound by detecting the presence or absence of noble metal species using EDX (energy dispersive X-ray analyzer). However, when a particle diameter of noble metal is smaller than a diameter of X-ray beam of the EDX, noble metal may not be detected. In such a case, when the first compound and the second compound contain cerium (Ce) or praseodymium (Pr) as an OSC material, it is preferable to discriminate between the first compound and the second compound by comparing the contents of Ce or Pr in the first compound and the second compound with the detected intensity ratio of Ce or Pr, which are preliminarily obtained during the preparation stage. In the case of the HAADF-STEM images, the discrimination may be carried out according to contrasts.

(2) Outline Extraction of First Compound and Second Compound from Images

The outline extraction of the first compound and the second compound is carried out using the images obtained in the analysis (1) described above. The extraction may be automatically carried out by contrasts using image processing software. Alternatively, the extraction may be manually carried out by transcription of the images on OHP sheets or the like.

(3) Defining Circular Approximation and Each Central Point from Surface Areas Based on Extracted Outlines, and (4) Detecting Closest Central Point and Measuring Distance The steps (3) and (4) may be carried out using commercially available image processing software. That is, the areas of the first compound and the second compound are calculated according to the extracted outlines, and circles having the same areas as the first compound and the second compound are presumed. Then, the second compound closest to a specific first compound is detected, and the distance between the respective centers of the circles is measured. Accordingly, the distance between the particles can be obtained.

With regard to the distance between the first compound and the second compound, when the first compound and the second compound are primary particles, a distance between the respective primary particles is the distance between the particles described above. When the first compound and the second compound are secondary particles, a distance between the catalyst unit 11 composed of the noble metal particles 6 and secondary particles including the first compound 7, and the promoter unit 12 composed of secondary particles of the second compound 9 is the distance between the particles.

In the catalyst powder, in the case in which the first compound and the second compound are enclosed with the third compound, the average diameter of the secondary particles of the first compound and the second compound is between 5 nm and 300 nm, and the degree of dispersion described below is 40% or more, the first compound and the second compound may be considered to be uniformly dispersed mutually. In other words, it is physically hard to prepare catalyst powder in which the first compound and the second compound are ununiformly dispersed purposely under the above-described conditions. Therefore, in such a case, the strict discrimination between the first compound and the second compound in the whole catalyst powder may be omitted.

Figure 2:
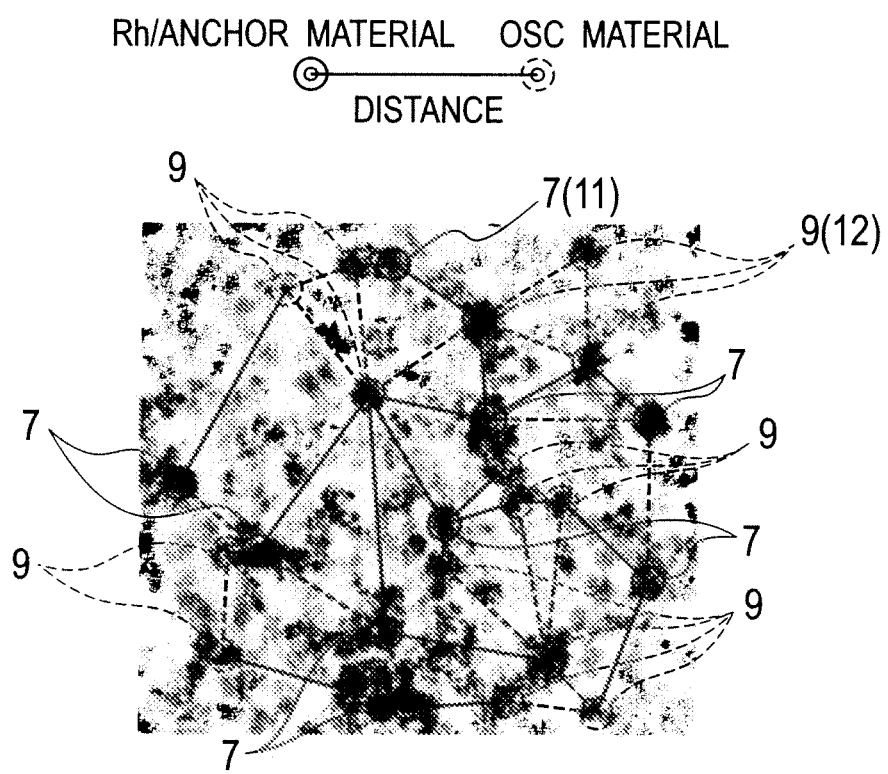
FIG. 2 is a micrograph showing a distance between a first compound and a second compound in catalyst powder.

FIG. 2 shows one example of the TEM-EDX photographs of the catalyst powder. In the measurement of the distance between the particles, the photograph obtained using the TEM-EDX is first subjected to image processing, as shown in FIG. 2, so as to extract the outlines of the respective particles of the first compound 7 and the second compound 9. Next, the surface areas of the respective particles are calculated, and circles having the same areas as the respective particles are presumed. Then, the second compound 9 closest to the specific first compound 7 is detected, and the distance between the respective centers of the circles is measured. Note that, in FIG. 2, the line connecting the first compound 7 to the second compound 9 is indicated by a solid line, and the line connecting the respective first compounds 7 or the line connecting the respective second compounds 9 is indicated by a dashed line.

Figure 3:
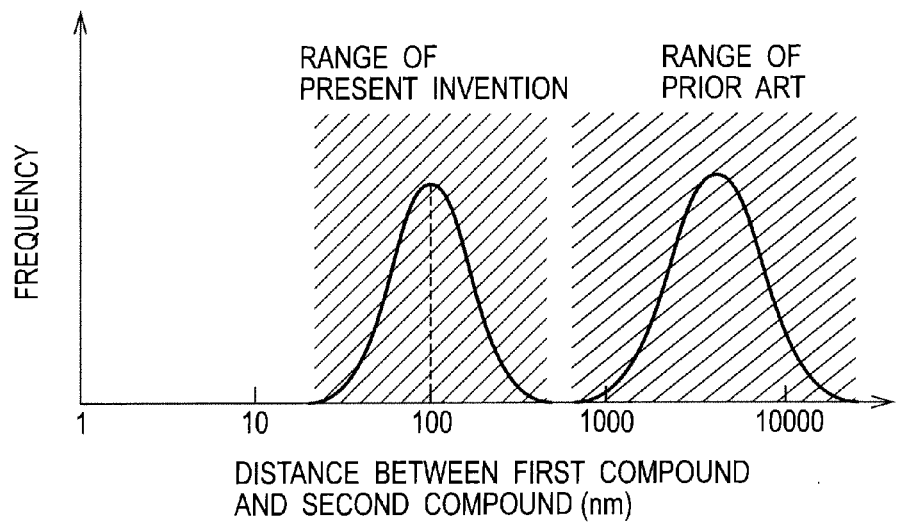
FIG. 3 is a graph showing a relationship between a distance between a first compound and a second compound, and frequency of appearance.

FIG. 3 is a graph showing the distance between the first compound 7 and the second compound 9 obtained as described above as a horizontal axis, and showing frequency of appearance as a vertical axis. In the catalyst according to the present invention, the distance between the anchor material (the first compound) and the OSC material (the second compound) is shorter than that in a conventional catalyst. Therefore, the catalyst of the present invention can ensure a sufficient supply of active oxygen to the noble metal particles and exert an excellent purifying performance compared with a conventional catalyst.

Note that, it is preferable that the ratio of the amount of the oxygen storage component contained in the first compound and the amount of the oxygen storage component contained in the second compound satisfy the following mathematical formula (1).

[Math 1]

$$\frac{\text{Amount of oxygen storage component contained in second compound (mol)}}{\text{Amount of oxygen storage component contained in first compound (mol)}} > 1.5 \quad (1)$$

In general, in the case in which noble metal particles of which a catalytic performance is enhanced in a reduction condition, such as rhodium, are supported on a first compound, when the first compound contains a large amount of an OSC material, the noble metal particles fall into a high oxidation state because of active oxygen in the OSC material. As a result, a decrease in performance of the noble metal particles may be caused. On the other hand, in the case in which the OSC material is contained in the second compound, and the average distance between the first compound and the second compound is adjusted to 5 nm to 300 nm, a reduction state of the noble metal particles can be maintained while active oxygen is sufficiently supplied to the noble metal particles. Note that, the catalyst of the present invention is not limited to the case in which the first compound does not contain the OSC material, and the first compound may contain a small amount of the OSC material. In addition, when the amounts of the OSC material in the first compound and the second compound are adjusted so as to satisfy the mathematical formula (1), degradation of the noble metal particles caused by oxidation can be prevented while the amount of active oxygen is ensured sufficiently. Here, when a molar ratio of the amount of the OSC material in the second compound to that in the first compound is 1.5 or less, the amount of the OSC material in the first compound is relatively increased. As a result, a promotion of oxidation and a decrease in performance of the noble metal particles may be caused.

In the catalyst according to the present invention, an average diameter of the secondary particles of the first compound is preferably 300 nm or less, and an average diameter of the secondary particles of the second compound is preferably 1000 nm or less. When the average diameter of the secondary particles of the first compound is more than 300 nm, a function as an anchor material holding the fine noble metal particles may be decreased rapidly. In addition, when the average diameter of the secondary particles of the second compound is more than 1000 nm, it is hard to enclose the first compound and the second compound concurrently with the third compound. In the present invention, however, since the average diameter of the secondary particles of the first compound is 300 nm or less, and the average diameter of the secondary particles of the second compound is 1000 nm or less, active oxygen can be supplied to the noble metal particles while a reduction state of the noble metal particles is maintained.

The average diameter of the secondary particles of the first compound is more preferably 200 nm or less. Due to such a configuration, aggregation of the noble metal particles is further suppressed since the amount of the noble metal particles supported on the secondary particles of the first compound is further decreased. In addition, the average diameter of the secondary particles of the second compound is more preferably 300 nm or less. Accordingly, a rate of supply of oxygen is improved and a catalytic performance is enhanced since the surface area of the second compound is significantly increased.

The respective average diameters of the secondary particles of the first compound and the second compound may be obtained by analysis of slurry containing the respective particles during the preparation of the catalyst powder using a laser diffraction particle size distribution analyzer. Note that, the average diameter of the secondary particles in this case is a median diameter (D50). Alternatively, the average diameter of the secondary particles of the respective compounds may be measured from TEM photographs of the prepared catalyst powder.

In the catalyst according to the present invention, an average particle diameter of the catalyst powder 5 is preferably 6 μm or less. This average particle diameter of the catalyst powder is a particle diameter of the catalyst powder 5 obtained in the case in which the surfaces of the inner walls of the through-holes of the honeycomb refractory inorganic substrate 2 are coated with the catalyst powder. When the average particle diameter of the catalyst powder 5 is more than 6 μm, a distance from the periphery to the core of the catalyst powder is increased, and a gas diffusion performance toward the powder core is significantly decreased. As a result, a purification performance may be decreased. In addition, when the average particle diameter is more than 6 μm, exfoliation or unevenness of the catalyst powder at the time of coating on the honeycomb substrate tends to be easily caused. The average particle diameter of the catalyst powder 5 is more preferably within a range of 1 μm to 4 μm, so that proper gaps are formed in the powder and exfoliation can be prevented.

Moreover, the catalyst powder 5 preferably has 40% or more of degree of dispersion of the first compound 7 and the second compound 9 in the catalyst powder. The degree of dispersion can be obtained according to the following mathematical formula (2).

[Math 2]

$$\text{Degree of dispersion (\%)} = 100 - \frac{\sigma(\text{nm})}{Av.(\text{nm})} \times 100 \quad (2)$$

In the formula, "a" represents a standard deviation of a distribution of the distance between the first compound and the second compound in the catalyst powder 5. "Av." represents an average distance between the first compound and the second compound 9 in the catalyst powder 5.

Figure 4:
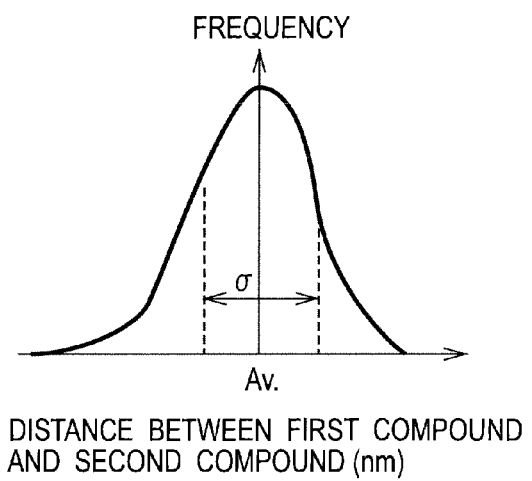
FIG. 4 is a graph showing a relationship between a distance between a first compound and a second compound, and frequency of appearance.

FIG. 4 is a graph showing a relationship between the distance between the first compound 7 and the second compound 9 in the catalyst powder 5, and frequency of appearance of the distance. As shown in FIG. 4, in the graph of the result of the measurement of the distance between the first compound and the second compound, when it is assumed that a frequency distribution is a normal distribution, the degree of dispersion is expressed as a probability of the presence of an arbitrary sample within the range of σ. Note that, the phrase "a represents a standard deviation" means that 68.26% of the distances between the first compounds 7 and the second compounds 9 is distributed within the range of an average distance Av (nm)+σ(nm).

FIG. 5 shows a schematic view of an example of catalyst powder of which degree of dispersion is high (FIG. 5(a)), and a schematic view of an example of catalyst powder of which degree of dispersion is low (FIG. 5(b)). If all the distances between the first compounds and the second compounds would be equal, the degree of dispersion of the catalyst is 100% (this means that the dispersion of the distances is 0). When the dispersion of the distances is large, the degree of dispersion of the catalyst is closer to 0%. Namely, when all the distances between the first compounds and the second compounds are geometrically equal, σ is 0 and the degree of dispersion is 100%.

As described above, the degree of dispersion defined as such is preferably 40% or more. When the degree of dispersion is 40% or more, a sufficient distance between the respective particles is ensured, and unevenness is decreased to a low level. As a result, aggregation between the compounds after a durability test is prevented.

This degree of dispersion is mutually related to the level of aggregation of the first compound and the second compound immediately before drying of slurry in which the first compound, the second compound, and the precursor of the third compound are mixed. Since the level of aggregation is dependent on a stirring force of the slurry, the degree of dispersion can be improved when the slurry is intensively stirred.

The first compound 7 may contain at least one main component selected from the group consisting of aluminum oxide ($Al_2O_3$), cerium oxide ($CeO_2$), zirconium oxide ($ZrO_2$), yttrium oxide ($Y_2O_3$) and neodymium oxide ($Nd_2O_3$). Among these, the particles of the first compound 7 preferably contain $Al_2O_3$ or $ZrO_2$ as a main component since $Al_2O_3$ and $ZrO_2$ have excellent resistance to high temperature and can maintain a high specific surface area. In the present description, the main component is a component of which the content in the particles is 50 atom % or more.

The second compound 9 preferably contains at least one of cerium (Ce) and praseodymium (Pr) that have an oxygen storage and release capacity. Particularly, the second compound preferably contains a compound as a main component having a high oxygen storage and release capacity, such as cerium oxide ($CeO_2$) and praseodymium oxide ($Pr_6O_{11}$). Both Ce and Pr are materials that constitute multivalent oxides, have a variable oxidation number because of atmospheric fluctuations of exhaust gas, and can store and release active oxygen.

As the noble metal particles 6, at least one element selected from the group consisting of platinum (Pt), palladium (Pd), rhodium (Rh), gold (Au), silver (Ag), iridium (Ir) and ruthenium (Ru) may be used. Among these, particularly platinum (Pt), palladium (Pd) and rhodium (Rh) can exert a high NOx purifying performance.

The catalyst powder 5 is particularly preferably an oxide in which the noble metal particles 6 are rhodium (Rh) and the first compound 7 contains at least zirconium (Zr). A catalytic performance of Rh tends to be easily decreased in a high oxidation state. However, high oxidization and aggregation of Rh can be suppressed by an adequate adjustment of the distance between the first compound and the second compound.

The high oxidization of Rh may be measured according to binding energy analysis by use of X-ray photoelectron spectroscopy (XPS). In general, it is known that 3d5 orbital binding energy of Rh is 307.2 eV in a metal state, and is approximately 310.2 eV in a high oxidation state. When an oxide such as $Al_2O_3$ and $ZrO_2$ is used as an anchor material, the 3d5 orbital binding energy of Rh is preferably 308.8 eV or less since a decrease in catalytic performance is caused when the 3d5 orbital binding energy is 308.8 eV or more. The 3d5 orbital binding energy of Rh may be adjusted to 308.8 eV or less by an adequate adjustment of the distance between the first compound and the second compound. At the time of measuring binding energy, a charge correction is generally carried out using a certain element, and binding energy of an element with a large content is corrected with respect to a literature value. For example, hydrocarbon contained in oil mist or the like derived from a pump for maintaining an X-ray photoelectron spectrometer in a vacuum state is used, and a C1s peak of this hydrocarbon is compared with a literature value, so as to carry out the correction.

As described above, when the noble metal particles 6 are rhodium, the first compound 7 is preferably an oxide containing zirconium as a main component. In the case in which the first compound 7 is an oxide containing alumina as a main component, rhodium and alumina form a solid solution, and rhodium is subjected to high oxidization. As a result, a catalytic activity may be decreased. On the other hand, in the case of an oxide containing Zr, more preferably in the case of an oxide containing 50% or more of Zr in the first compound in terms of atom %, high oxidization and aggregation of Rh can be suppressed. Examples of such an oxide containing Zr as a main component include zirconia ($ZrO_2$), and lanthanum-containing zirconia (Zr—La—$O_x$) and lanthanum-ceria-containing zirconia (Zr—La—Ce—$O_x$).

When the catalyst of the present invention includes the third compound, the third compound 10 preferably contains at least one of aluminum (Al) and silicon (Si). The third compound is preferably made of a material that can enclose the first compound and the second compound, and also ensure gas permeability. With regard to such a material, a compound containing at least one of Al and Si, such as alumina ($Al_2O_3$) and silica ($SiO_2$), has a large volume of fine pores, and can ensure high gas permeability. The third compound may be a composite compound (a composite oxide) of Al and Si.

The third compound 10 has a plurality of the fine pores 10a having a size sufficient to allow exhaust gas and active oxygen to pass therethrough as described above, while the third compound 10 covers the first compound 7 and the second compound 9 sufficiently to prevent a physical movement of the respective compounds. As the third compound 10, alumina or silica may be used. When the third compound 10 contains alumina, it is preferable to use boehmite (AlOOH) as a precursor. That is, the first compound 7 supporting the noble metal particles 6 and the second compound 9 are added to slurry obtained in such a manner that boehmite is dispersed in a solvent such as water, and then stirred. Thus, boehmite is adhered to the peripheries of the first compound 7 and the second compound 9. Subsequently, the mixed slurry is dried and baked, so that boehmite is dehydrated and condensed at the peripheries of the first compound 7 and the second compound 9. Accordingly, the third compound containing alumina derived from boehmite (for example, γ-alumina) is formed. The third compound thus obtained containing alumina derived from boehmite has excellent gas permeability while covering the first compound 7 and the second compound 9, since the third compound has a large number of fine pores having a size of 30 nm or less.

Similarly, when the third compound contains silica, silica sol and zeolite are used as a precursor. That is, the first compound 7 supporting the noble metal particles 6 and the second compound 9 are added to slurry obtained in such a manner that silica sol and zeolite are dispersed in a solvent, and then stirred, followed by drying and baking. Thus, the third compound containing silica is formed. The third compound thus obtained containing silica derived from silica sol and zeolite also has excellent gas permeability while covering the first compound 7 and the second compound 9, since the third compound has a large number of fine pores having a size of 30 nm or less.

At least one of the first compound and the second compound is preferably an oxide further containing at least one element selected from the group consisting of iron (Fe), manganese (Mn), cobalt (Co) and nickel (Ni). Namely, as described above, the first compound 7 contains alumina and zirconia as a main component, and the second compound 9 contains cerium oxide and praseodymium oxide as a main component. In addition, at least one of the first compound and the second compound preferably contains transition metal described above as an additive. When at least one transition metal is contained in at least one of these compounds, a catalytic activity, especially a purification rate of CO and NOx, can be improved due to active oxygen contained in transition metal.

In addition, at least one of the first compound and the second compound preferably further contains at least one NOx adsorbing material selected from the group consisting of barium (Ba), magnesium (Mg), calcium (Ca), strontium (Sr) and sodium (Na). A compound containing such an element functions as a NOx adsorbing material. Therefore, when at least one of the first compound and the second compound contains a NOx adsorbing material, a NOx purification performance is improved. This is because a NOx adsorbing reaction has high sensitivity to contact with gas. The catalyst containing such a NOx adsorbing material is preferably used as a catalyst for a lean burn engine in which a large amount of NOx is generated rather than an engine in which fuel combustion is carried out around a stoichiometric air-fuel ratio.

In the case in which the catalyst according to the present invention is used for exhaust gas purification for an actual vehicle, the catalyst powder 5 is applied to the inner surface of the refractory inorganic substrate 2, as shown in FIG. 1, and then the refractory inorganic substrate 2 is installed in a flow path of exhaust gas of an internal combustion engine. The catalyst layer applied to the refractory inorganic substrate may be composed of plural layers having different component compositions. When the plural catalyst layers 3 and 4 are formed on the refractory inorganic substrate, at least one of the catalyst layers 3 and 4 may contain the catalyst powder 5.

[Method for Manufacturing Exhaust Gas Purifying Catalyst]

The following is an explanation of a method for manufacturing the exhaust gas purifying catalyst according to the present invention. In the exhaust gas purifying catalyst according to the present invention, the noble metal particles, the first compound and the second compound, and the third compound as necessary, are preliminarily prepared. The catalyst powder is then obtained according to the process including the step of supporting the noble metal particles on the first compound, and the step of mixing the first compound supporting the noble metal particles with the second compound. When the catalyst includes the third compound, the first compound supporting the noble metal particles and the second compound are mixed first, followed by adding the third compound thereto, so as to obtain the catalyst powder.

More preferably, the process of obtaining the catalyst powder further includes the step of pulverizing the first compound and the second compound integrally or individually, followed by enclosing the first compound and the second compound after pulverization simultaneously with a precursor of the third compound.

More specifically, the noble metal particles 6 are supported on the first compound 7 first. The noble metal particles 6 may be supported by use of an impregnation method. Then, the first compound 7 supporting the noble metal particles 6 on the surface thereof is pulverized by use of a bead mill or the like, so as to have a desired particle diameter. Similarly, the second compound 9 is pulverized by used of a bead mill or the like, so as to have a desired particle diameter. In this case, the first compound 7 and the second compound 9 may be pulverized in a mixed state, or may be mixed individually. When the first compound 7 and the second compound 9 are pulverized individually, the first compound 7 and the second compound 9 can be formed to have a desired secondary particle diameter, respectively. When the respective primary particle diameters of the first compound 7 and the second compound 9 are different from each other, a mixture of the first compound 7 and the second compound 9 that have different average diameters of the secondary particles may be obtained even when the first compound 7 and the second compound 9 are pulverized integrally. Note that, when a fine raw material such as an oxide colloid is used as a raw material of the first compound 7 and/or the second compound 9, the pulverizing step may be omitted.

When the first compound and the second compound are enclosed with the third compound after pulverization, it is preferable not to mix the enclosed first compound with the enclosed second compound, but to enclose the first compound and the second compound concurrently with the third compound. Accordingly, the first compound and the second compound can be dispersed uniformly without unevenness.

More specifically, the first compound and the second compound are added to slurry in which a precursor of the third compound is dispersed, and the mixture is then stirred. When the slurry is stirred, the precursor of the third compound is adhered to the peripheries of the first compound and the second compound. At this time, the slurry is intensively stirred so that the respective particles are dispersed in the slurry. As a result, the degree of dispersion can be improved. Subsequently, the mixed slurry is dried and baked. Thus, the catalyst powder 5 in which the third compound is provided at the peripheries of the first compound 7 and the second compound 9 can be obtained.

Thereafter, the catalyst powder 5 thus obtained is pulverized. The catalyst powder 5 may be subjected to either wet pulverization or dry pulverization. In general, the catalyst powder 5 is added to a solvent such as deionized water, and the mixture thus obtained is stirred and pulverized using a ball mill or the like, so as to obtain catalyst slurry. At this time, a binder is added to the catalyst slurry as necessary. An average particle diameter (D50) of the catalyst powder 5 in the catalyst slurry is preferably 6 µm or less as described above. Subsequently, the catalyst slurry is applied to the inner surface of the honeycomb substrate, followed by drying and baking. Thus, the exhaust gas purifying catalyst can be obtained.

EXAMPLES

Hereinafter, the present invention will be described in more detail in accordance with examples and comparative examples. However, the present invention is not limited to these examples.

Each catalyst powder of Examples 1 to 14 and Comparative Examples 1 to 3 shown in Table 1, and each catalyst powder of Examples 15 to 18 shown in Table 2 were prepared, and then applied to the surface of the inner wall of a honeycomb substrate, respectively. The respective catalysts in the examples and the comparative examples shown in Table 1 and Table 2 were prepared as follows.

TABLE 1

| | Noble Metal | First Compound (Mol % in parentheses) Type | First Compound Average Particle Diameter (nm) | Second Compound (Mol % in parentheses) Type | Second Compound Average Particle Diameter (nm) | First Compound – Second Compound Average Distance (nm) | OSC Material Content Ratio of Second Compound to First Compound |
|---|---|---|---|---|---|---|---|
| Example 1 | Rh | Zr—La—Ox | 135 | Zr—Ce(20)—Ox | 220 | 135 | 100> |
| Example 2 | Rh | Zr—Ce(7)—La—Ox | 145 | Zr—Ce(20)—Y—Ox | 200 | 145 | 2.9 |
| Example 3 | Rh | Zr—Ce(20)—Ox | 140 | Zr—Ce(20)—Ox | 185 | 160 | 1 |
| Example 4 | Rh | Zr—La—Ox | 350 | Zr—Ce(20)—Ox | 250 | 290 | 100> |
| Example 5 | Rh | Zr—La—Ox | 130 | Zr—Ce(20)—Ox | 131 | 145 | 100> |
| Example 6 | Rh | Zr—La—Ox | 155 | Zr—Ce(20)—Ox | 220 | 180 | 100> |
| Example 7 | Rh | Zr—La—Ox | 160 | Zr—Pr(17)—Nd—Ox | 185 | 165 | 100> |
| Example 8 | Rh | Zr—Ce(7)—La—Ox | 155 | Zr—Ce(20)—Fe—Ox | 165 | 160 | 2.9 |
| Example 9 | Rh | Zr—Ce(7)—La—Ox | 155 | Zr—Ce(20)—Co—Ox | 180 | 170 | 2.9 |
| Example 10 | Rh | Zr—Ce(7)—La—Ox | 155 | Zr—Ce(20)—Ni—Ox | 200 | 185 | 2.9 |
| Example 11 | Rh | Zr—Ce(7)—La—Ox | 155 | Zr—Ce(20)—Mn—Ox | 195 | 188 | 2.9 |
| Example 12 | Rh | Zr—Ce(7)—La—Ox | 155 | Zr—Ce(20)—Y—Ox | 200 | 185 | 2.9 |
| Example 13 | Rh | Zr—Ce—Ox | 21 | Zr—Ce—Ox | 65 | 40 | 2.9 |
| Example 14 | Rh | Zr—La—Ox | 150 | Zr—Ce(20)—Ox | 200 | 180 | 100> |
| Comparative Example 1 | Rh | Zr—La—Ox | 140 | Zr—Ce(20)—Ox (mixed in coat layer) | — | 3525 | 100> |
| Comparative Example 2 | Rh | Zr—La—Ox | 155 | Zr—Ce(20)—Ox | 180 | 1430 | 2.5 |
| Comparative Example 3 | Rh | Zr—Ce(30)—Ox | 155 | — | — | <2 | — |

| | (First Compund + Second Compound): Third Compound (wt %) | Third Compound Type | Degree of dispersion (%) | Catalyst Powder Particle Diameter (µm) | NOx Purification Rate after Durability Test (%) |
|---|---|---|---|---|---|
| Example 1 | 70:30 | Al₂O₃ | 56 | 2.7 | 93 |
| Example 2 | 50:50 | Al₂O₃ | 51 | 2.5 | 97 |
| Example 3 | 70:30 | Al₂O₃ | 52 | 3.5 | 85 |
| Example 4 | 70:30 | Al₂O₃ | 42 | 2.3 | 95 |
| Example 5 | 70:30 | Al₂O₃ | 48 | 7 | 88 |
| Example 6 | 70:30 | Al₂O₃ | 25 | 3 | 85 |
| Example 7 | 70:30 | Al₂O₃ | 55 | 2.8 | 94 |
| Example 8 | 70:30 | Al₂O₃ | 58 | 2.5 | 96 |
| Example 9 | 70:30 | Al₂O₃ | 54 | 2.8 | 95 |
| Example 10 | 70:30 | Al₂O₃ | 56 | 2.7 | 98 |
| Example 11 | 70:30 | Al₂O₃ | 53 | 2.9 | 94 |
| Example 12 | 70:30 | Al₂O₃ | 41 | 2.9 | 94 |
| Example 13 | 70:30 | Al₂O₃ | 55 | 2.9 | 98 |
| Example 14 | 70:30 | SiO₂ | 45 | 3 | 83 |
| Comparative Example 1 | 70:30 | Al₂O₃ | 50 | 2.9 | 71 |
| Comparative Example 2 | 70:30 | Al₂O₃ | 56 | 1.5 | 81 |
| Comparative Example 3 | 70:30 | Al₂O₃ | 51 | 3.1 | 80 |

TABLE 2

| | Noble Metal | First Compound (Mol % in parentheses) Type | First Compound Average Particle Diameter (nm) | Second Compound (Mol % in parentheses) Type | Second Compound Average Particle Diameter (nm) | First Compound – Second Compound Average Distance (nm) | OSC Material Content Ratio of Secomd Compound to First Compound |
|---|---|---|---|---|---|---|---|
| Example 15 | Rh | Zr—Ce(7)—La—Ox | 155 | Zr—Ce(20)—Ox | 220 | 180 | 2.9 |
| Example 16 | Rh | Zr—Ce(7)—La—Ox | 155 | Zr—Ce(20)—Ba—Ox | 250 | 195 | 2.9 |
| Example 17 | Rh | Zr—Ce(7)—Ba—Ox | 195 | Zr—Ce(20)—Mg—Ox | 213 | 201 | 2.9 |
| Example 18 | Rh | Zr—Ce(7)—La—Ox | 155 | Zr—Ce(20)—Na—Ox | 160 | 165 | 2.9 |

| | (First Compund + Second Compound): Third Compound (wt %) | Third Compound Type | Degree of dispersion (%) | Catalyst Powder Particle Diameter (μm) | NOx Purification Rate after Durability Test (%) |
|---|---|---|---|---|---|
| Example 15 | 70:30 | Al₂O₃ | 50 | 2.9 | 24 |
| Example 16 | 70:30 | Al₂O₃ | 48 | 3.0 | 85 |
| Example 17 | 70:30 | Al₂O₃ | 51 | 2.8 | 91 |
| Example 18 | 70:30 | Al₂O₃ | 53 | 2.4 | 73 |

Example 1

First compound powder of which a specific surface area was approximately 70 m²/g was impregnated with a solution of rhodium nitrate in such a manner that a supporting concentration of rhodium was 1.0 wt %. The material thus obtained was dried at 150° C. throughout the day, and then baked at 400° C. for one hour. Thus, a first compound of which the rhodium-supporting concentration was 1.0 wt % was obtained. The rhodium-supporting first compound thus obtained was pulverized so as to have an average particle diameter (D50) as shown in Table 1. The average particle diameter was measured by use of a laser diffraction/scattering particle size distribution analyzer LA-920 manufactured by Horiba Ltd.

At the same time, second compound powder of which a specific surface area was 80 m²/g was pulverized so as to have an average particle diameter (D50) as shown in Table 1. The average particle diameter was measured by use of the same apparatus as in the case of the first compound.

Next, boehmite used for a precursor of a third compound, nitric acid and water were mixed, and stirred for one hour, so as to prepare precursor slurry. Then, the Rh-supporting first compound after pulverization and the second compound after pulverization were respectively added slowly to the precursor slurry thus obtained, followed by stirring for additional two hours by use of a high-speed stirrer, so as to obtain mixed slurry. Thereafter, the mixed slurry thus obtained was dried rapidly, further dried at 150° C. throughout the day to remove moisture, and then baked at 550° C. for three hours in air. Thus, catalyst powder of Example 1 was obtained.

Subsequently, 225 g of the catalyst powder, 25 g of alumina sol, 230 g of water, and 10 g of nitric acid were put into a magnetic ball mill and then mixed, so as to obtain catalyst slurry.

In addition to the catalyst slurry, Pt-supporting Al₂O₃ catalyst powder and Ce—Zr—Ox powder were preliminarily mixed, so as to obtain slurry in the same manner as the catalyst slurry. The slurry thus obtained was applied to a cordierite monolithic substrate (0.12 L, 400 cells), and redundant slurry in the cells was then removed by flowing air. Subsequently, the substrate was dried at 130° C. and then baked at 400° C. for one hour. Thus, a catalyst substrate coated with 100 g/L of the Pt-supporting Al₂O₃ catalyst powder and the Ce—Zr—Or powder in total was prepared.

Thereafter, the catalyst slurry was applied to the catalyst substrate coated with Pt, and redundant slurry in the cells was removed by flowing air. The substrate was then dried at 130° C. and baked at 400° C. for one hour. Thus, a catalyst coated with 50 g/L of the catalyst layer containing Rh provided on the 100 g/L of the catalyst layer containing Pt was obtained.

Example 2

The Rh-supporting concentration in the first compound powder in Example 1 was adjusted to 1.4 wt % in Example 2. In addition, a weight ratio of the total amount of the first compound powder and the second compound powder to the third compound (Al₂O₃) was adjusted to 50:50. The material compositions of the first compound and the second compound were determined as shown in Table 1. The catalyst was thus obtained in the same manner as Example 1 except for the above-described processes. In the catalyst of Example 2, yttrium (Y) is contained in the second compound in order to improve heat resistance of the second compound.

Examples 3 to 12

The catalysts of Examples 3 to 12 were obtained in the same manner as Example 1, except that the material compositions of the first compound and the second compound and the secondary particle diameters were changed as shown in Table 1. In the catalyst of Example 7, neodymium (Nd) is contained in the second compound, and in the catalyst of Example 12, yttrium (Y) is contained in the second compound, in order to improve heat resistance of the respective second compounds.

Example 13

In Example 13, composite oxide colloid with a primary particle diameter of 21 nm was used in the first compound, and composite oxide colloid with a primary particle diameter of 65 nm was used in the second compound. Rhodium was supported only on the first compound. Then, the catalyst of Example 13 was obtained in the same manner as Example 1, except that the pulverization step of the first compound on which rhodium was supported was omitted, and the first compound and the second compound were mixed with the precursor slurry.

Example 14

The catalyst of Example 14 was obtained in the same manner as Example 1, except that commercially available silica sol was used instead of boehmite slurry used for the precursor of the third compound at the time of the preparation of the catalyst slurry in Example 1. The secondary particle diameter and the other numerical values of this example are as shown in Table 1.

Comparative Example 1

Comparative Example 1 is an example in which the OSC material is contained not in the catalyst powder, but in the catalyst layer formed on the monolithic substrate.

First compound powder of which a specific surface area was approximately 70 m²/g was impregnated with a solution of rhodium nitrate in such a manner that a supporting concentration of rhodium was 1.0 wt %. The material thus obtained was dried at 150° C. throughout the day, and then baked at 400° C. for one hour. Thus, a first compound of which the rhodium-supporting concentration was 1.0 wt % was obtained. The rhodium-supporting first compound thus obtained was pulverized so as to have an average particle diameter (D50) as shown in Table 1. The average particle diameter was measured by use of the same apparatus as in the case of Example 1.

At the same time, boehmite, nitric acid and water were mixed, and stirred for one hour, so as to prepare precursor slurry. Then, the Rh-supporting first compound after pulverization was added slowly to the precursor slurry thus obtained, followed by stirring for additional two hours by use of a high-speed stirrer, so as to obtain mixed slurry. Thereafter, the mixed slurry thus obtained was dried rapidly, further dried at 150° C. throughout the day to remove moisture, and then baked at 550° C. for three hours in air. Thus, catalyst powder of Comparative Example 1 was obtained.

Subsequently, 125 g of the catalyst powder, 100 g of Zr—Ce—$O_x$ powder, 25 g of alumina sol, 230 g of water, and 10 g of nitric acid were put into a magnetic ball mill and then mixed, so as to obtain catalyst slurry.

In addition to the catalyst slurry, Pt-supporting $Al_2O_3$ catalyst powder and Ce—Zr—$O_x$ powder were preliminarily mixed, so as to obtain slurry in the same manner as the catalyst slurry. The slurry thus obtained was applied to a cordierite monolithic substrate (0.12 L, 400 cells), and redundant slurry in the cells was then removed by flowing air. Subsequently, the substrate was dried at 130° C. and baked at 400° C. for one hour. Thus, a catalyst substrate coated with 100 g/L of the Pt-supporting $Al_2O_3$ catalyst powder and the Ce—Zr—$O_x$ powder in total was prepared.

Thereafter, the catalyst slurry was applied to the catalyst substrate coated with Pt, and redundant slurry in the cells was removed by flowing air. The substrate was then dried at 130° C. and baked at 400° C. for one hour. Thus, a catalyst coated with 50 g/L of the catalyst layer containing Rh provided on the 100 g/L of the catalyst layer containing Pt was obtained.

Comparative Example 2

Comparative Example 2 is an example in which the first compound and the second compound are covered with the third compound not simultaneously but individually. The degree of dispersion of the catalyst in Comparative Example 2 is a value of the powder obtained in such a manner that the first compound is enclosed with the third compound.

First compound powder of which a specific surface area was approximately 70 m²/g was impregnated with a solution of rhodium nitrate in such a manner that a supporting concentration of rhodium was 1.0 wt %. The material thus obtained was dried at 150° C. throughout the day, and then baked at 400° C. for one hour. Thus, a first compound of which the rhodium-supporting concentration was 1.0 wt % was obtained. The rhodium-supporting first compound thus obtained was pulverized so as to have an average particle diameter (D50) as shown in Table 1. The average particle diameter was measured by use of the same apparatus as in the case of Example 1.

At the same time, boehmite, nitric acid and water were mixed, and stirred for one hour, so as to prepare precursor slurry. Then, the Rh-supporting first compound after pulverization was added slowly to the precursor slurry thus obtained, followed by stirring for additional two hours by use of a high-speed stirrer, so as to obtain mixed slurry. Thereafter, the mixed slurry thus obtained was dried rapidly, further dried at 150° C. throughout the day to remove moisture, and then baked at 550° C. for three hours in air. Thus, a catalyst powder raw material A of Comparative Example 2 was obtained.

In addition, second compound powder was pulverized, so as to have an average particle diameter (D50) as shown in Table 1. The average particle diameter was measured by use of the same apparatus as in the case of Example 1.

In addition to the catalyst powder raw material A, boehmite, nitric acid and water were mixed, and stirred for one hour, so as to prepare precursor slurry. Then, the second compound after pulverization was added slowly to the precursor slurry thus obtained, followed by stirring for additional two hours by use of a high-speed stirrer, so as to obtain mixed slurry. Thereafter, the mixed slurry thus obtained was dried rapidly, further dried at 150° C. throughout the day to remove moisture, and then baked at 550° C. for three hours in air. Thus, a catalyst powder raw material B of Comparative Example 2 was obtained.

Subsequently, 125 g of the catalyst powder raw material A, 100 g of the catalyst powder raw material B, 25 g of alumina sol, 230 g of water, and 10 g of nitric acid were put into a magnetic ball mill and then mixed, so as to obtain catalyst slurry.

In addition to the catalyst slurry, Pt-supporting $Al_2O_3$ catalyst powder and Ce—Zr—$O_x$ powder were preliminarily mixed, so as to obtain slurry in the same manner as the catalyst slurry. The slurry thus obtained was applied to a cordierite monolithic substrate (0.12 L, 400 cells), and redundant slurry in the cells was then removed by flowing air. Subsequently, the substrate was dried at 130° C. and baked at 400° C. for one hour. Thus, a catalyst substrate coated with 100 g/L of the Pt-supporting $Al_2O_3$ catalyst powder and the Ce—Zr—$O_x$ powder in total was prepared.

Thereafter, the catalyst slurry was applied to the catalyst substrate coated with Pt, and redundant slurry in the cells was removed by flowing air. The substrate was then dried at 130° C. and baked at 400° C. for one hour. Thus, a catalyst coated with 50 g/L of the catalyst layer containing Rh provided on the 100 g/L of the catalyst layer containing Pt was obtained.

Comparative Example 3

Comparative Example 3 is an example in which the second compound is not included, and the noble metal particles are supported on the first compound having an oxygen storage capacity.

First compound powder of which a specific surface area was approximately 70 m²/g was impregnated with a solution of rhodium nitrate in such a manner that a supporting concentration of rhodium was 1.0 wt %. The material thus obtained was dried at 150° C. throughout the day, and then baked at 400° C. for one hour. Thus, a first compound of which the rhodium-supporting concentration was 1.0 wt % was obtained. The rhodium-supporting first compound thus obtained was pulverized so as to have an average particle diameter (D50) as shown in Table 1. The average particle diameter was measured by use of the same apparatus as in the case of Example 1.

At the same time, boehmite, nitric acid and water were mixed, and stirred for one hour, so as to prepare precursor slurry. Then, the Rh-supporting first compound after pulverization was added slowly to the precursor slurry thus obtained, followed by stirring for additional two hours by use of a high-speed stirrer, so as to obtain mixed slurry. Thereafter, the mixed slurry thus obtained was dried rapidly, further dried at 150° C. throughout the day to remove moisture, and then baked at 550° C. for three hours in air. Thus, catalyst powder of Comparative Example 3 was obtained.

Subsequently, 125 g of the catalyst powder, 100 g of $Al_2O_3$ powder, 25 g of alumina sol, 230 g of water, and 10 g of nitric acid were put into a magnetic ball mill and then mixed, so as to obtain catalyst slurry.

In addition to the catalyst slurry, Pt-supporting $Al_2O_3$ catalyst powder and $Ce-Zr-O_x$ powder were preliminarily mixed, so as to obtain slurry in the same manner as the catalyst slurry. The slurry thus obtained was applied to a cordierite monolithic substrate (0.12 L, 400 cells), and redundant slurry in the cells was then removed by flowing air. Subsequently, the substrate was dried at 130° C. and baked at 400° C. for one hour. Thus, a catalyst substrate coated with 100 g/L of the Pt-supporting $Al_2O_3$ catalyst powder and the $Ce-Zr-O_x$ powder in total was prepared.

Thereafter, the catalyst slurry was applied to the catalyst substrate coated with Pt, and redundant slurry in the cells was removed by flowing air. The substrate was then dried at 130° C. and baked at 400° C. for one hour. Thus, a catalyst coated with 50 g/L of the catalyst layer containing Rh provided on the 100 g/L of the catalyst layer containing Pt was obtained.

Examples 15 to 18

In Example 15, the preliminarily prepared catalyst substrate including the catalyst layer containing Pt used in Example 1 was subjected to the following treatment, so that Ba was contained in the catalyst layer containing Pt. That is, the catalyst substrate coated with Pt was impregnated for a predetermined period of time with a solution in which pure water and an aqueous solution of barium acetate (40 wt % concentration) were mixed, followed by removing moisture and drying at 400° C. for one hour. Thus, a catalyst substrate including the catalyst layer containing Pt and Ba was prepared. The other steps are the same as in the case of Example 1.

In Examples 16 to 18, Ba, Mg and Na as a NOx adsorbing material were respectively contained in the first compound and/or the second compound.

[Evaluation 1]

Among the respective examples and comparative examples, Examples 1 to 14 and Comparative Examples 1 to 3 were subjected to durability testing treatment, and then a NOx conversion rate of the respective examples were measured. As a method of the durability testing treatment, the catalyst was installed in an exhaust system of a 3500 cc-gasoline engine, an inlet temperature of the catalyst was adjusted to 800° C., and the engine was continuously operated for 50 hours. The fuel used was unleaded gasoline. The NOx conversion rate was measured according to the mathematical formula (3), while the catalyst was installed in the exhaust system of a 3500 cc-gasoline engine, and the inlet temperature of the catalyst was adjusted to 400° C.

[Math 3]

$$NOx \text{ conversion rate } (\%) = \frac{(NOx \text{ concentration at catalyst inlet}) - (NOx \text{ concentration at catalyst outlet})}{(NOx \text{ concentration at catalyst inlet})} \times 100$$

The distance between the first compound and the second compound in the respective examples was measured by use of a TEM-EDX analyzer (HF-2000, manufactured by Hitachi, Ltd.). An accelerating voltage in this evaluation was adjusted to 200 kV. The cutting condition by an ultramicrotome was set at a room temperature. The outlines of the first compound and the second compound were extracted from the images obtained by the TEM-EDX analyzer using an image analyzer (KS-400, manufactured by Carl Zeiss Co., Ltd.). Thereafter, the areas of the first compound and the second compound were calculated based on the extracted outlines, circular approximation and each central point were defined, and the detection of the closest central points and the measurement of the distance were carried out. Thus, the distance between the first compound and the second compound was obtained. In addition, the degree of dispersion of the catalyst was obtained according to the above-described formula.

Table 1 shows the NOx conversion rate after the durability testing treatment of the respective catalysts in Examples 1 to 14 and Comparative Examples 1 to 3, in addition to the distance between the first compound and the second compound and the degree of dispersion of the catalyst in the respective examples.

In Example 1, the average distance between the first compound and the second compound was 135 nm. The ratio of the amount of the oxygen storage component (mol) in the first compound to the amount of the oxygen storage component (mol) in the second compound exceeded 100. The average diameter of the secondary particles of the first compound was 135 nm, and the average diameter of the secondary particles of the second compound was 220 nm. The average particle diameter of the catalyst powder containing the noble metal particles was 2.7 μm, and the degree of dispersion was 56%. In the exhaust gas purifying test, the NOx conversion rate of Example 1 showed an excellent purifying performance as high as 93%.

In Example 2, the first compound supporting the noble metal particles has an oxygen storage capacity since the first compound contains cerium in addition to zirconium as a main component. The average distance between the first compound and the second compound in Example 2 was 145 nm. The ratio of the amount of the oxygen storage component (mol) in the first compound to the amount of the oxygen storage component (mol) in the second compound was 2.9. In addition, the NOx conversion rate of Example 2 showed an excellent purifying performance as high as 97%.

In Example 3, since the first compound and the second compound are the identical compounds, the ratio of the amount (mol) of the oxygen storage component in the first compound to the amount (mol) of the oxygen storage component in the second compound is 1.0. Therefore, the amount of Ce in the first compound is relatively high. As a result, Rh is in a high oxidation state. Accordingly, Example 1 had a higher purifying performance than Example 3.

In Example 4, the secondary particle diameter of the first compound was as large as 350 nm. However, since the first compound was enclosed with the third compound, the aggregation was stopped and not promoted more than that. As a result, a high purifying performance was ensured.

In Example 5, the particle diameter of the catalyst powder was as large as 7.0 μm. Therefore, the gas diffusion performance in the catalyst powder was decreased. Accordingly, the purifying performance in Example 5 was decreased compared with Example 1.

In Example 6, since the agitation of the slurry was stopped before the drying step of the mixed slurry, the degree of dispersion was decreased to 25%. As a result, the particle aggregation of the first compound and the second compound was occurred after the durability test. Accordingly, the purifying performance in Example 6 was decreased compared with Example 1.

In Example 7, praseodymium was applied to the OSC material of the second compound, and an excellent purifying performance, substantially the same as Example 1, was shown in Example 7.

In Examples 8 to 11, the second compound further contained various types of transition metal elements. Since the second compound was an oxide containing those transition metal elements, active oxygen was supplied, and as a result, a purifying performance was improved.

In Example 14, $SiO_2$ was used as the third compound. The conversion rate in Example 14 was lower than the respective conversion rates in Examples 1 to 13 in which $Al_2O_3$ was used as the third compound. However, the purifying performance was improved compared with Comparative Example 1.

In Comparative Example 1, the powder obtained in such a manner that the first compound was covered with the third compound, and the Zr—Ce—$O_x$ powder used in Example 1 were mixed in the catalyst layer. In Comparative Example 1, since the Zr—Ce—$O_x$ powder as an OSC material was not enclosed with the third compound, the particle aggregation of the Zr—Ce—$O_x$ powder because of a crystal growth was promoted after the durability test. In addition, there was a long distance between the first compound supporting the noble metal particles and the OSC material. As a result, the catalytic performance in Comparative Example 1 was decreased compared with the respective examples.

In Comparative Example 2, the first compound and the second compound were separately covered with the third compound. The degree of dispersion of the catalyst of Comparative Example 2 is a value of the powder obtained in such a manner that the first compound is enclosed with the third compound. The catalyst of Comparative Example 2 ensures an improved performance that was achieved due to the prevention of aggregation of the noble metal particles compared with Comparative Example 1, since the first compound supporting the noble metal particles was enclosed with the third compound. However, there was a long distance between the first compound and the second compound, and the purifying performance was decreased, compared with the catalysts of Example 1 and the other examples.

In Comparative Example 3, the catalyst did not include the second compound, and all the Rh particles were present on the first compound (Zr—Ce(30)-$O_x$). In the catalyst of Comparative Example 3, the Rh particles and the first compound were detected in the same site on the TEM-EDX. However, since the diameter of EDX beam is 2 nm, the distance between them is determined to be 2 nm or less. In the catalyst of Comparative Example 3, since the Rh particles were supported on the first compound having an oxygen storage capacity, the Rh particles were in a high oxidation state, and the catalytic performance was decreased.

Figure 6:
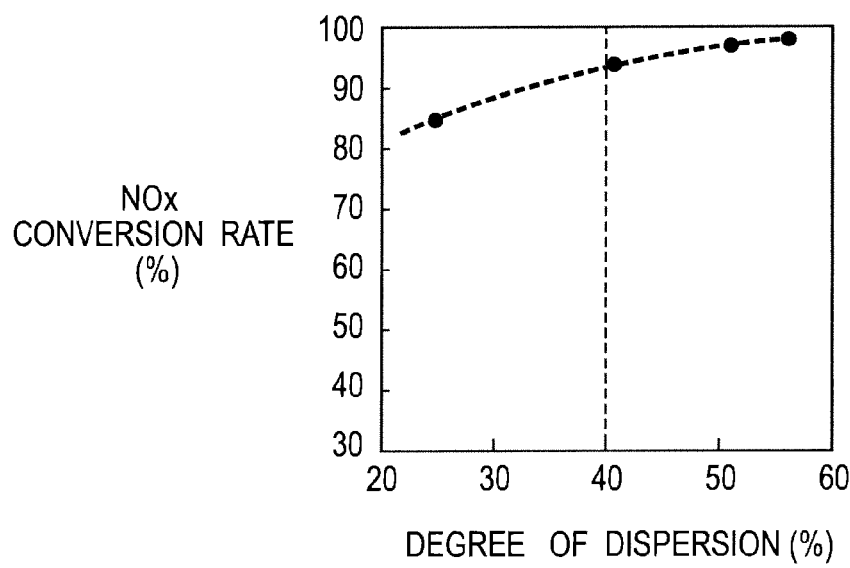
FIG. 6 is a graph showing a relationship between degree of dispersion and a NOx conversion rate.

Next, the catalysts manufactured in such a manner that each degree of dispersion was purposely changed in the manufacturing process were subjected to a catalytic performance evaluation. FIG. 6 shows a relationship between the degree of dispersion and the NOx conversion rate with regard to the four catalysts of Example 6, Example 12, Example 2 and Example 10, each having different degrees of dispersion. According to FIG. 6, when the degree of dispersion is 40% or more, particle aggregation is suppressed since the dispersion of the distance between the first compound and the second compound is decreased. As a result, the purifying performance is improved.

Figure 7:
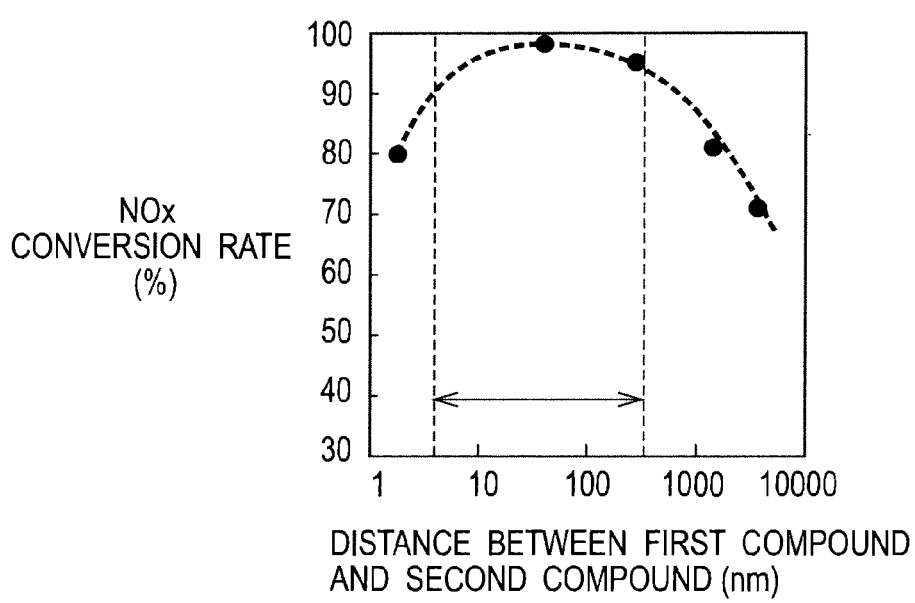
FIG. 7 is a graph showing a relationship between a distance between a first compound and a second compound, and a NOx conversion rate.

In addition, the catalysts, each of which had a different average distance between the first compound and the second compound, were subjected to the catalytic performance evaluation. FIG. 7 shows a relationship between the average distance and the NOx conversion rate with regard to the respective catalysts of Comparative Example 1, Comparative Example 2, Example 4, Example 13 and Comparative Example 3. According to FIG. 7, when the average distance between the first compound and the second compound is within a range of 5 nm to 300 nm, active oxygen is effectively supplied to the noble metal particles from the OSC material, and an excessive supply of active oxygen can be prevented. Accordingly, the NOx purifying performance can be improved.

[Evaluation 2]

Next, by use of the respective catalysts of Examples 15 to 18 shown in Table 2, the purifying performance was evaluated under the condition of the atmosphere shifting from a lean atmosphere to a rich atmosphere based on the assumption that the respective catalysts were applied to a lean burn engine.

This evaluation was carried out under the condition that each catalyst was installed in an exhaust system of a 3500 cc-gasoline engine, an inlet temperature of the catalyst was adjusted to 700° C., and the engine was subjected to durability testing treatment of a 50-hour operation. Then, the catalyst after the durability testing treatment was installed in an exhaust system of a 2000 cc-gasoline engine, the inlet temperature of the catalyst was adjusted to 300 to 350° C., and the engine was operated while the atmosphere was shifted from a lean condition for 40 seconds to a rich condition for 2 seconds. Thus, the exhaust gas purification rate (the NOx conversion rate) in this range was obtained. The air-fuel ratio (A/F) in the lean atmosphere was 25, and the air-fuel ratio in the rich atmosphere was 11. The formula for calculation of the NOx conversion rate is the same as that described above. In addition, the distance between the first compound and the second compound and the degree of dispersion of the respective examples were measured in the same manner as Examples 11 to 14.

The NOx conversion rate of the respective catalysts is indicated in Table 2 as well as the distance between the first compound and the second compound, the degree of dispersion of the respective catalysts, and the like.

As is clear from Table 2, the NOx conversion rate was significantly improved in Examples 16 to 18 in which barium (Ba), magnesium (Mg) and sodium (Na) were respectively contained as a NOx adsorbing material in the first compound and/or the second compound, compared with Example 15 in which these elements were not contained in the first compound and/or the second compound.

The entire content of Japanese Patent Application No. P2009-051071 (filed on Mar. 4, 2009) is herein incorporated by reference.

Although the present invention has been described above by reference to the embodiment and the examples, the present invention is not limited to those, and it will be apparent to these skilled in the art that various modifications and improvements can be made.

INDUSTRIAL APPLICABILITY

According to the exhaust gas purifying catalyst of the present invention, the second compound having an oxygen storage capacity is not in contact with the noble metal particles having a catalytic action, and the distance between the first compound in contact with the noble metal particles and the second compound is adjusted to a predetermined range. Accordingly, a decrease in purifying performance derived from excessive oxidization of the noble metal particles or a supply shortage of oxygen can be prevented.

REFERENCE SIGNS LIST

| | |
|---|---|
| 1 | Exhaust gas purifying catalyst |
| 5 | Catalyst powder |
| 6 | Noble metal particles |
| 7 | First compound |
| 9 | Second compound |
| 10 | Third compound |
| 10a | Fine pores |

The invention claimed is:

1. An exhaust gas purifying catalyst, comprising:
a catalyst unit which contains: noble metal particles; and a first compound supporting the noble metal particles; and
a promoter unit which contains a second compound disposed not in contact with the noble metal particles and having an oxygen storage capacity,
a third compound which encloses both the catalyst unit and the promoter unit, and separates the noble metal particles and the first compound in the catalyst unit from the second compound in the promoter unit,
wherein the third compound has a plurality of fine pores, and an average fine pore diameter of the fine pores is smaller than an average particle diameter of the first compound and an average particle diameter of the second compound, and
wherein an average distance between a central point of the catalyst unit and a central point of the promoter unit is between 5 nm and 300 nm.

2. The exhaust gas purifying catalyst according to claim 1, wherein a ratio of an amount of an oxygen storage component contained in the first compound and an amount of an oxygen storage component contained in the second compound satisfies the following mathematical formula (1):

$$\frac{\text{Amount of oxygen storage component contained in second compound (mol)}}{\text{Amount of oxygen storage component contained in first compound (mol)}} > 1.5. \quad (1)$$

3. The exhaust gas purifying catalyst according to claim 1, wherein an average diameter of secondary particles of the first compound is 300 nm or less, and an average diameter of secondary particles of the second compound is 1000 nm or less.

4. The exhaust gas purifying catalyst according to claim 1, comprising a catalyst powder which contains the noble metal particles, the first compound, the second compound and the third compound, wherein an average particle diameter of the catalyst powder is 6 μm or less.

5. The exhaust gas purifying catalyst according to claim 1, wherein the noble metal particles are rhodium, and the first compound is an oxide containing zirconium.

6. The exhaust gas purifying catalyst according to claim 1, wherein an oxygen storage component contained in the second compound and having an oxygen storage capacity contains at least one of cerium and praseodymium.

7. The exhaust gas purifying catalyst according to claim 1, wherein the third compound contains at least one of aluminum and silicon.

8. The exhaust gas purifying catalyst according to claim 1, comprising a catalyst powder which contains the noble metal particles, the first compound, the second compound and the third compound, wherein a degree of dispersion of the first compound and the second compound in the catalyst powder is 40% or more.

9. The exhaust gas purifying catalyst according to claim 8, wherein the degree of dispersion of the first compound and the second compound in the catalyst powder containing the noble metal particles, the first compound, the second compound and the third compound is between 41% and 58%.

10. The exhaust gas purifying catalyst according to claim 1, wherein at least one of the first compound and the second compound is an oxide containing at least one element selected from the group consisting of iron, manganese, cobalt and nickel.

11. The exhaust gas purifying catalyst according to claim 1, wherein at least one of the first compound and the second compound is a compound containing at least one element selected from the group consisting of barium, magnesium, calcium, strontium and sodium.

12. The exhaust gas purifying catalyst according to claim 1, comprising a catalyst powder which contains the noble metal particles, the first compound, the second compound and the third compound, wherein the catalyst powder is applied to a refractory inorganic substrate.

13. The exhaust gas purifying catalyst according to claim 12, compring a catalyst layer formed on the refractory inorganic substrate and containing the catalyst which is composed of a plurality of layers having different component compositions.

14. The exhaust gas purifying catalyst according to claim 1, wherein the average distance between the central point of the catalyst unit and the central point of the promoter unit is between 40 nm and 290 nm.

15. A method for manufacturing an exhaust gas purifying catalyst according to claim 1, comprising:
pulverizing the first compound and the second compound individually or integrally; and
enclosing the first compound and the second compound pulverized with a precursor of the third compound concurrently.

* * * * *